United States Patent
Qin et al.

(10) Patent No.: US 7,858,001 B2
(45) Date of Patent: Dec. 28, 2010

(54) PHOTOCHROMIC LENS

(75) Inventors: Xuzhi Qin, Hacienda Heights, CA (US); Hideyo Sugimura, North Oaks, MN (US); Michael S. Boulineau, Forest Lake, MN (US); Thomas J. Moravec, Maple Grove, MN (US); Derek Harris, Woodbury, MN (US)

(73) Assignee: Insight Equity A.P.X., L.P., Ramsey, MN (US)

( * ) Notice: Subject to any disclaimer, the term of this patent is extended or adjusted under 35 U.S.C. 154(b) by 781 days.

(21) Appl. No.: 11/537,571

(22) Filed: Sep. 29, 2006

(65) Prior Publication Data

US 2007/0122626 A1    May 31, 2007

Related U.S. Application Data

(63) Continuation-in-part of application No. 10/938,275, filed on Sep. 9, 2004.

(60) Provisional application No. 60/722,848, filed on Sep. 29, 2005, provisional application No. 60/501,819, filed on Sep. 9, 2003, provisional application No. 60/501,820, filed on Sep. 9, 2003.

(51) Int. Cl.
    B29D 11/00    (2006.01)
(52) U.S. Cl. ..................... 264/1.7; 264/1.32
(58) Field of Classification Search ............... 264/1.32, 264/1.7
    See application file for complete search history.

(56) References Cited

U.S. PATENT DOCUMENTS

| | | |
|---|---|---|
| 3,963,679 A | 6/1976 | Ulrich et al. |
| 3,988,610 A | 10/1976 | Street |
| 4,012,232 A | 3/1977 | Uhlmann et al. |
| 4,035,213 A | 7/1977 | Thoma et al. |
| 4,046,586 A | 9/1977 | Uhlmann et al. |
| 4,106,861 A | 8/1978 | Brewer et al. |
| 4,166,043 A | 8/1979 | Uhlmann et al. |
| 4,170,567 A | 10/1979 | Chu et al. |
| 4,367,170 A | 1/1983 | Uhlmann et al. |
| 4,628,134 A | 12/1986 | Gould et al. |
| 4,882,438 A | 11/1989 | Tanaka et al. |
| 4,889,413 A | 12/1989 | Ormsby et al. |
| 4,960,678 A | 10/1990 | Tanaka et al. |
| 4,992,347 A | 2/1991 | Hawkins et al. |
| 5,017,698 A | 5/1991 | Machida et al. |
| 5,106,998 A | 4/1992 | Tanaka et al. |
| 5,130,058 A | 7/1992 | Tanaka et al. |
| 5,246,989 A | 9/1993 | Iwamoto et al. |

(Continued)

FOREIGN PATENT DOCUMENTS

GB    2174711 A    11/1986

(Continued)

OTHER PUBLICATIONS

International Search Report mailed Mar. 6, 2007 for International Application No. PCT/US06/38142, International Filing Date Sep. 29, 2006.

*Primary Examiner*—Thao T. Tran
(74) *Attorney, Agent, or Firm*—Inskeep IP Group, Inc.

(57)    ABSTRACT

A cast photochromic lens including a photochromic film and a cast resin, curable by heat or radiation.

4 Claims, 2 Drawing Sheets

U.S. PATENT DOCUMENTS

| | | | |
|---|---|---|---|
| 5,252,450 A | 10/1993 | Schwerzel et al. | |
| 5,349,065 A | 9/1994 | Tanaka et al. | |
| 5,430,146 A | 7/1995 | Tanaka et al. | |
| 5,658,502 A | 8/1997 | Hughes | |
| 5,702,645 A | 12/1997 | Hughes | |
| 5,708,063 A | 1/1998 | Imura et al. | |
| 5,840,926 A | 11/1998 | Hughes | |
| 5,851,328 A | 12/1998 | Kohan | |
| 5,851,585 A | 12/1998 | Gupta et al. | |
| 5,854,710 A | 12/1998 | Rao et al. | |
| 5,872,648 A | 2/1999 | Sanchez et al. | |
| 6,025,026 A | 2/2000 | Smith et al. | |
| 6,068,797 A * | 5/2000 | Hunt | 264/1.7 |
| 6,096,246 A | 8/2000 | Chan et al. | |
| 6,113,812 A | 9/2000 | Hughes | |
| 6,114,437 A | 9/2000 | Brown et al. | |
| 6,180,033 B1 | 1/2001 | Greshes | |
| 6,256,152 B1 | 7/2001 | Coldrey et al. | |
| 6,296,785 B1 | 10/2001 | Nelson et al. | |
| 6,319,433 B1 | 11/2001 | Kohan | |
| 6,328,446 B1 | 12/2001 | Bhalakia et al. | |
| 6,334,681 B1 | 1/2002 | Perrott et al. | |
| 6,698,884 B2 | 3/2004 | Perrott et al. | |
| 6,863,848 B2 | 3/2005 | Engardio et al. | |
| 7,008,568 B2 | 3/2006 | Qin | |
| 7,025,458 B2 * | 4/2006 | Vu | 351/177 |
| 7,036,932 B2 | 5/2006 | Boulineau et al. | |
| 7,077,985 B2 | 7/2006 | Maki et al. | |
| 7,335,702 B2 | 2/2008 | La Dous | |
| 7,350,917 B2 | 4/2008 | Kawai et al. | |
| 7,465,414 B2 | 12/2008 | Knox et al. | |
| 2002/0197484 A1 | 12/2002 | Nishizawa et al. | |
| 2004/0125335 A1 | 7/2004 | Vu | |
| 2004/0207809 A1 | 10/2004 | Blackburn | |
| 2005/0009964 A1 | 1/2005 | Sugimura et al. | |
| 2005/0168689 A1 | 8/2005 | Knox | |
| 2005/0168690 A1 | 8/2005 | Kawai et al. | |
| 2005/0233153 A1 | 10/2005 | Qin et al. | |
| 2006/0065989 A1 | 3/2006 | Druffel et al. | |
| 2006/0146278 A1 | 7/2006 | Vu | |
| 2006/0187411 A1 | 8/2006 | Boulineau et al. | |
| 2006/0192306 A1 | 8/2006 | Giller et al. | |
| 2006/0244909 A1 | 11/2006 | Maki et al. | |
| 2006/0264593 A1 | 11/2006 | Nagoh et al. | |
| 2007/0001327 A1 | 1/2007 | Chiu | |
| 2007/0122626 A1 | 5/2007 | Qin et al. | |
| 2007/0177100 A1 | 8/2007 | Knox | |
| 2007/0291345 A1 | 12/2007 | Kumar et al. | |

FOREIGN PATENT DOCUMENTS

| | | |
|---|---|---|
| JP | 61276882 A | 12/1986 |
| JP | 63178193 A | 7/1988 |
| JP | 3269507 A | 12/1991 |
| JP | 4358145 A | 12/1992 |
| JP | 9001716 A | 1/1997 |
| JP | 2002196103 A | 7/2002 |
| WO | WO-02093235 A1 | 11/2002 |

* cited by examiner

PHOTOCHROMIC LENS

CROSS REFERENCE TO RELATED APPLICATIONS

This application claims the benefit of priority from U.S. Provisional Application No. 60/722,848 filed on Sep. 29, 2005 entitled Photochromic Lens; and is a Continuation-In-Part of U.S. application Ser. No. 10/938,275 filed on Sep. 9, 2004 entitled Photochromic Polyurethane Laminate, which claims the benefit of priority from U.S. Provisional Application Ser. No. 60/501,819 filed Sep. 9, 2003 entitled Photochromic Film and Method of Manufacture, and which claims the benefit of priority from U.S. Provisional Application Ser. No. 60/501,820 filed on Sep. 9, 2003 entitled Photochromic Laminate which are hereby incorporated herein by reference.

BACKGROUND OF THE INVENTION

Many methods and devices are known in the art for incorporating photochromic characteristics into an ophthalmic lens. One example of a method known in the art includes imbibing or infusing photochromes into the host material or base lens from a transfer layer (that is subsequently removed) prior to formation of the finished lens product. Another example of a method known in the art includes incorporating photochromes into a lens by imbibing or coating a photochromic composition onto the surface of a base lens. Yet another example of a method known in the art includes incorporating photochromes into a finished lens product by combining a prepared photochromic insert or "laminate" with base lens material, typically via an injection molding process. The following are illustrative examples of such methods known in the art.

The imbibing process was one of the first processes to be used to impart photochromicity to plastic lenses. U.S. Pat. No. 4,286,957 to Naour-Sene describes this process. Further refinements were discussed in U.S. Pat. No. 4,880,667 to Welch. Various improvements to this imbibing process have been developed, such as described in U.S. Pat. No. 5,130,353 to Fisher et. al., and U.S. Pat. No. 5,185,390 to Fisher et. al. These two patents suggest improvements to the transfer process with a unique transfer layer. It was recognized early on that the plastic resins used to make ophthalmic lenses do not provide the best host material for photochromes. In such plastic resin materials, the photochromes do not activate easily and fatigue or wear-out in a short period of time. A strong activation darkness to near sunglass darkness is desired in the marketplace. Another desired characteristic of a photochromic lens is that it should maintain at least 70 percent of its original activation darkness after two years of wear. This is one of the limitations to putting photochromes into polymeric host materials that are used to form the bulk of the lens.

A more recent example, U.S. Pat. No. 5,728,758 to Smith describes a photochromic article in which the organic polymeric host material has been impregnated with photochromes prior to formation of the finished lens product. As is described in the '758 patent, one of the drawbacks of incorporating photochromes directly into the polymeric host material is the problem of fatigue or light fatigue. Photochromes are believed to lose their ability to change color specifically resulting from the irreversible decomposition of the photochromic compound, which occurs due to repeated exposure to UV light over time. The '758 patent specifically address this problem by using a unique combination of monomers and surface coating compositions to improve abrasion resistance, chemical attack and improved fatigue resistance.

Alternatively, an example that describes coating of a photochromic layer onto the surface of a lens is found in U.S. Pat. No. 4,756,973 to Sakagami et al. The '973 patent specifically describes the use of spirooxazine compound and phenolic compound in the photochromic layer, and describes that such a lens formulation provides successful coloring effects in photochromic lenses that are subjected to environmental conditions ranging from normal to high temperatures.

Another example that describes coating photochromes on the surface of a lens substrate is found in U.S. Pat. No. 6,150,430 to Walters et al. Specifically, the '430 patent describes a process that includes the steps of treating the surface of a polymeric substrate to provide reactive groups, applying a polymerizable composition to the surface, exposing the coated substrate to radiation to improve adhesion, and applying and curing a photochromic composition to the coated surface. The '430 patent, at least in part, addresses a method of producing commercially acceptable "cosmetic" standards for photochromic and non-photochromic optical coatings that are applied to lenses. A major limitation of the photochromic coating approach is the poor scratch resistance of such a coating even with another hard coating on top of the photochromic coating. Additionally, if the photochromic coating is scratched, it will result in streaks of areas on the lens that do not activate.

The limitations of the performance of the photochromes in the various plastics used to make ophthalmic lenses have resulted in various improvement methods, including making composite or multiple part lenses that combine plastics that are good photochromic hosts with additional plastics to make improved ophthalmic lenses. One example of this approach is described in U.S. Pat. No. 5,531,940 to Gupta et. al. Another approach is to put the photochromic dyes in the glue layer between two lens sections as described in U.S. Pat. No. 5,851,328 to Kohan. More recent attempts at making photochromic composites are described in U.S. Pat. Nos. 6,863,844 and 6,863,848 to Engardio et. al. and U.S. Publication No. 20050089630 to Schlunt et. al. One problem with these approaches is that the mechanical stability of the composite is not very durable in subsequent processing to make the ophthalmic lens and mount it into a frame. Processes such as surfacing the lens to prescription power and edge cutting to fit into a frame result in chipping of the composite due to the different cutting and grinding characteristics of the materials. Drilling of the composite to mount into rimless frames also results in chipping of the composite.

Lastly, the following methods known in the art illustrate incorporation of photochromes into ophthalmic lenses via photochromic inserts or laminates, whether by cast-mold-type processes or by injection molding processes. For example, U.S. Pat. No. 4,889,413 to Ormsby et al. describes creation of a finished laminate product that is created by placing two glass or plastic layers into a mold and injecting a photochromically-infused plastic resin between the glass/plastic layers. The resulting photochromic laminate is thereafter cured and processed, producing a finished lens product.

Another example that illustrates the use of a photochromic insert or laminate in an injection molding process is described in U.S. Pat. No. 6,328,446 to Bhalakia et al. The photochromic laminate or wafer includes inner and outer resin sheets (or protective layers), which sandwich a photochromic cellulose acetate butyrate layer. The unitary photochromic laminate is thereafter placed inside a mold cavity, after which a molten polycarbonate resin is injected into the cavity and fused to the back of the photochromic laminate. The lens is then cooled to room temperature and the finished product is an injection molded, photochromic polycarbonate lens.

While each of the above-referenced patents and published applications describe methods of making photochromic lenses and address particular problems in the art, improvements are still required. For example, problems associated with impregnating photochromes within the host material of a base lens have been described to some degree above. Additionally, if such a lens is a semi-finished product and requires further processing (e.g., grinding, polishing, etc), it is clear that photochromes present in the base lens will be ground and/or polished away, inevitably diminishing the desired coloring effects of the finished lens product. In addition, the prescription lens must be robust enough to maintain its integrity through subsequent processing to both form the prescription and be edged, cut and possibly drilled for mounting into a frame.

Alternatively, the shortcomings of coating photochromic products onto the surface of a lens have to do primarily with coating thickness and the creation of segmented, multi-focal lenses. For example, a coating of about 25 μm or more is needed to incorporate a sufficient amount of photochromic compounds to provide the desired light blocking quality in the lens when the compounds are activated. However, a coating of this thickness is not well suited for application on the surface of a segmented, multi-focal lens because it is too thick. Typically, a coating of this thickness creates such problems as the creation of an unacceptable segment line, as well as coating thickness uniformity issues around the segment line.

Problems that have been raised particularly regarding use of photochromic laminates or inserts in injection molding process include, primarily, the bleeding of the functional layer (e.g., photochromic layer) material of the laminate or wafer. By the term "bleeding," it is meant that the functional layer materials between the transparent resin sheets (e.g., the protective layer of the laminate or wafer) runs out from between the resin sheets in the lateral direction.

Often bleeding occurs due to the deformation of the photochromic layer under the high temperature and pressure used during the injection molding process. This is thought to occur due to either an excess amount of functional layer material and/or inadequate softening properties of the functional layer material. Further, this bleeding can interfere with any additional coating layers that are applied to the lens after injection-molding. The Bhalakia patent adequately addresses the issue of making laminates used in injection-molding, through improvement of laminate materials and properties. However, the issues addressed by Bhalakia do not include providing a laminate or insert that may be used in a cast-lens manufacturing process.

Therefore, a need exists to create a photochromic lens that addresses the problem of maximizing photochromic properties of a lens produced in a cast-mold manufacturing process.

SUMMARY OF THE INVENTION

It is an object of the present invention to provide a photochromic lens that includes a relatively long service life and provides good resistance to photochromic dye fatigue. It is another object of the present invention to provide a photochromic lens that reduces the amount of photochromic dyes used during the manufacturing process. It is yet another embodiment of the present invention to provide a photochromic lens that is not limited from use with surface designs, such as bi-focal lenses.

It is yet another object of the present invention to provide a method of manufacturing a photochromic lens that can utilize most commercially available cast resins, such as those made by thermoset or radiation initiated processes. It is yet another embodiment of the present invention to provide a photochromic lens having high impact resistance, using known and commercially available high impact resinous layers and materials, such as polycarbonate.

DETAILED DESCRIPTION OF THE INVENTION

Figure 1:
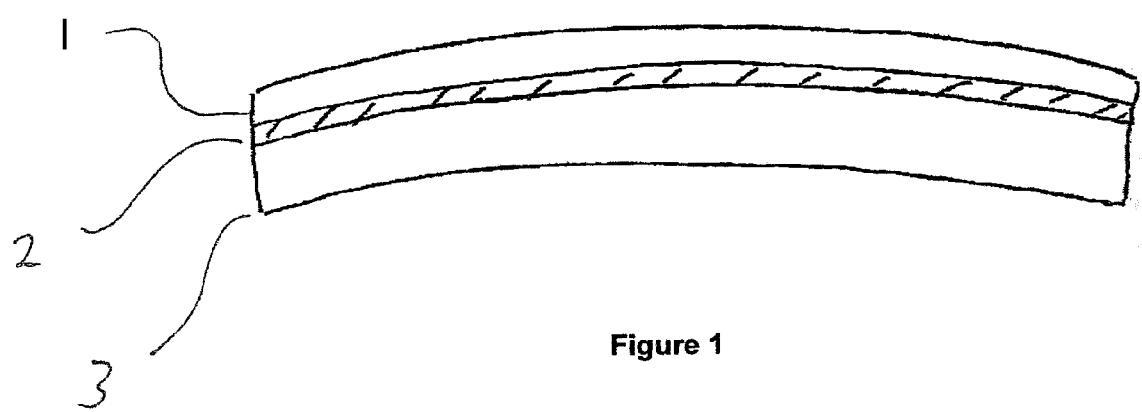
FIG. 1 illustrates a photochromic lens according to a preferred embodiment of the present invention.
Figure 2:
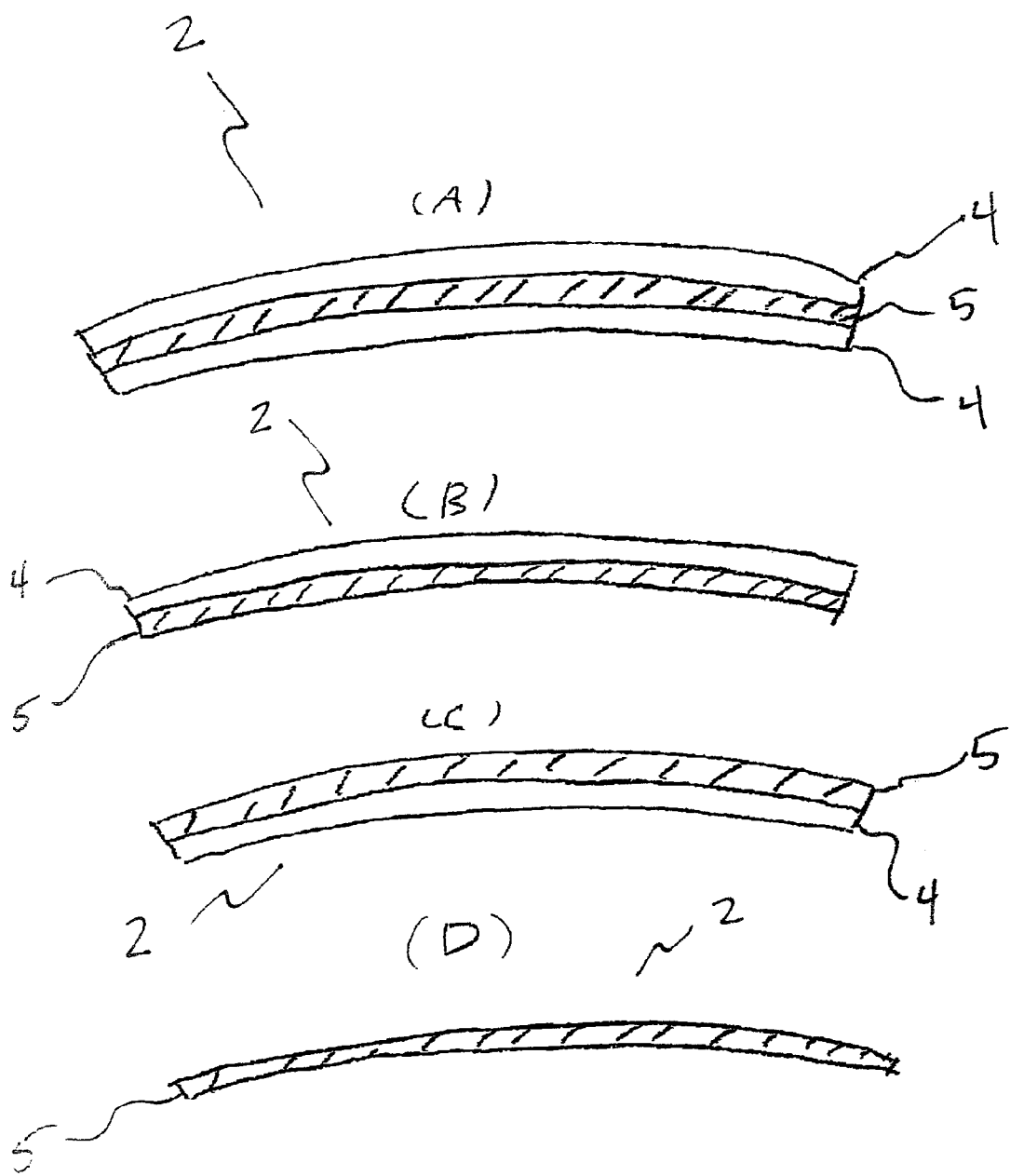
FIGS. 2A-2D illustrate a photochromic film, as embedded in a photochromic lens of FIG. 1), according to a preferred embodiment of the present invention.

As seen in FIG. 1, one embodiment according to the present invention relates to a photochromic lens comprising a front cast resin layer 1, a photochromic film 2, and a back cast resin layer 3. Specifically, a preferred embodiment would include a photochromic lens made from a cast resin that is either thermoset or radiation-set. The photochromic lens may be either a finished product or a semi-finished product. In one embodiment (as shown in FIG. 2), a photochromic lens may include a photochromic film 2 including at least one protective layer 4 and a photochromic layer 5 (as shown in FIG. 2, examples (A), (B) and (C)). In another embodiment, the photochromic film may include just a photochromic layer 5 (as shown in FIG. 2, example (D)). In each of these embodiments, the photochromic film 2 is bonded or adhered strongly to a casting resin layer 1, 3 during a casting process (as shown in FIG. 1). The photochromic film 2 in the form of a laminate may be optimized as a host for a photochromic dye to provide for maximum performance of the dye.

As seen in FIG. 2, additional embodiments according to the present invention would include a photochromic film 2 having at least one protective layer 4 and a photochromic layer 5, in a variety of orientations to one another (e.g., FIG. 2, examples (A), (B), and (C)). Not shown are additional hard coating, primer, or barrier coatings that may be applied onto the front surface of the protective layer 4 (e.g., for enhancing adhesion and other performances), the front surface meaning the surface of the protective layer 4 facing away from the photochromic layer 5. When the photochromic layer 5 is used as a photochromic film 2 without protective layers 4, the photochromic layer 5 may also have such hard, primer or barrier coatings applied before placement into the cast lens.

Additional embodiments according to the present invention may include a cast photochromic lens including a number of layers and/or combinations of layers, comprising, for example, protective layers, photochromic layers or films, and/or additional coating layers (e.g. hard coating, primer layers, and/or other barrier layers)(not shown). Each of the above-described photochromic lenses can be conveniently manufactured through a casting process.

A suitable photochromic film (laminate) is disclosed in U.S. patent application Ser. No. 10/938,275 entitled Photochromic Polyurethane Laminate, filed Sep. 9, 2004, which is herein incorporated by reference. A preferred material for the protective layers 4 of the photochromic film 2 should have good compatibility with the lens casting material. By the term "compatibility", it is meant that the adhesion between the protective layer 4 and the front cast resin layer 1 formed by the lens casting material is sufficient to pass ordinary tests for eyewear lenses without damage or chemical attack to the protective layers 4 of the photochromic film 2 (e.g. FDA drop-ball test, drilling and mounting tests).

Examples of preferred materials for the protective layers 4 of the photochromic film 2 include acrylate resins, cellulose esters, and polycarbonate resins. Suitable hard coatings known in the art may further protect such protective layer resins to prevent the casting resin from chemically attacking the protective layer resins during processing.

Preferred materials for the photochromic layer 5 of the present invention would include, for example, plastic host resins having a glass transition temperature, $T_g$, of less than 50° C., and more preferably, below 30° C. These plastics tend to be mechanically soft which is ideal for the photochromes to activate and de-activate. When the photochromic dyes absorb UV light, typically a carbon-oxygen bond in the photochromic dye molecule is broken and the dye molecule rotates into a form that absorbs visible light. A soft plastic host for the dye that would facilitate this action preferably would include a class of plastic hosts, such as polyurethanes. However, historically, this mechanical softness of plastic hosts has been shown deficient when such materials are used as ophthalmic lens materials. Therefore, a preferred embodiment of an ophthalmic lens contemplated for use with the present invention would include encapsulation of a host urethane resin, such as a photochromic layer 5, within an ophthalmic lens. A preferred thickness of the photochromic layer 5, namely the photochromic urethane layer 5 would preferably be 10 mil or less, more preferably 4 mil or less and most preferably, to 2 mil or less.

Preferred polyurethane photochromic host materials would include, for example, thermoplastic and thermoset polyurethanes. Examples of such host materials are disclosed in U.S. Pat. Nos. 4,889,413, 6,107,395, and 6,166,129, and U.S. patent application Ser. No. 10/938,275, which are herein incorporated by reference. The polyurethane composition would preferably include the following: 0.05% to 6% pbw of photochromic compound(s), and a stabilizer package: 0.5% to 6% pbw of light stabilizer(s), 0.5% to 6% pbw of antioxidant(s), 0.5% to 6% pbw of UV absorber(s). Also, the photochromic film 2 would preferably have a thickness no greater than 40 mil.

Any lens casting resins available on the market and known in the art would be suitable to produce the photochromic lens of the present invention. Examples of such casting resins would include CR-39 from PPG (or equivalent from Great Lakes Chemicals denoted by the tradename of RAV-7) and MR series cast resins from Mitsui. In addition to thermoset resins, cast resins that are curable by radiation energy (e.g., UV) are also suitable for use with the present invention. The radiation curing process is advantageous in that it will not interfere or degrade the photochromic dyes due to their protection inside the laminate. Examples of radiation curable cast resins would include, for example, those resins based on acrylate chemistry.

It is preferable that the cast resin for the front protective layer 4 of the photochromic film 2 should not include UV absorbers, which would significantly absorb or block the activation wavelength of the photochromic dye. The photochromic layer 5 of the photochromic film 2 would provide adequate UV protection to the eyes, as the photochromic dyes imparted to the photochromic layer 5 are extremely efficient absorbers of UV.

Examples of manufacturing the photochromic lens as contemplated in the present invention would include, for instance, a cast molding process, in which a photochromic film 2 is first placed into a cast mold. Thereafter, a cast resin 1, 3 may also be introduced into the cast mold and the lens would be cured, forming an integrate photochromic cast lens. The photochromic film 2 may be placed in any number of orientations within the mold, depending upon desired results and lens processing applications.

One embodiment for manufacturing the lens of the present invention would include the steps of preparing a photochromic film 2, as earlier described; forming discs of the film into wafers, preferably having a curve matching the front base curve of the lens to be produced; preparing a cast setup comprising a front mold, a formed wafer, a back lid (mold), in a cast gasket; pouring a cast resin into the front cavity formed by the front mold and the wafer, and the back cavity formed by the wafer and the back lid (mold); and curing the cast resin to form the photochromic lens.

Forming of the photochromic film 2 may be done by a variety of different ways familiar to those in the arts. Examples of lens forming techniques may include, for instance, compression forming and vacuum forming.

A cast setup used to produce polarizing lenses from cast resins could also used to cast the photochromic lens of the present invention without any modification.

Another embodiment for manufacturing a lens as contemplated by the present invention includes incorporation of photochromes into the polyurethane plastic, and thus the photochromic film 2, after the polyurethane has been formed (e.g., after urethane monomers and catalyst have reacted to fully form polyurethane). This is contrary to the teaching of U.S. Pat. No. 4,889,413 (herein incorporated by reference), which describes incorporation of photochromes into the urethane monomer/catalyst mixture, prior to formation of polyurethane. Further, the teaching of the '413 patent describes a the method of preparing and assembling a lens unlike that of the present invention. The '413 patent describes assembly of pre-cast lenses (either plastic or glass), between which a photochromic host is introduced and thereafter cured.

One embodiment of a method contemplated for use with the present invention may include the steps of: dissolving an appropriate amount of photochromic dye into a polyurethane resin with an appropriate solvent; casting the resultant solution on a smooth surface, to allow the solvent to evaporate; placing the resulting sheet or film of photochromic polyurethane into a mold with a thermoset casting monomer liquid and catalyst; and completing a curing or reaction step of the thermoset monomer into a thermoset, fully cured lens with the polyurethane film encased inside the thermoset lens.

This particular embodiment would result in a photochromic thermoset, cast lens with improved photochromic properties. Thus, one does not need to mix the photochromes with the polyurethane monomers first. One has the option of putting the polyurethane in a laminate as described above or not in a laminate inside the lens (plastic host).

EXAMPLE 1

A photochromic film was prepared according to the examples in U.S. patent application Ser. No. 10/938,275. The polyurethane layer is 40 μm thick, and the protective layers are 76 μm cellulose acetate butyrate (CAB) films (K-Mac). The polyurethane layer and protective layers were bonded together to form a photochromic laminate. The laminate was masked with a 3M film (24S56W). A 70-mm disk was die-cut off from the above laminate, and formed into a 6-base laminate wafer through a thermo-vacuum forming process. The temperature was 255° F., and the forming time was 200 seconds. A 70-mm lens cast gasket and two 6-base glass molds (front and back) were used to cast the photochromic lens. The masked film is thereafter removed prior to placement of the laminate wafer into the gasket. The laminate wafer was fixed in the gasket about 1 mm away from the front mold surface with help of a spacer. A clear UV-curable cast resin from OptiCast was injected into the front and back cavities. The front cavity is formed by the front mold and the photochromic film. The cast resin in the above setup was cured under a 12-mW/m² exposure for 10 minutes. The result was a cast resin lens having the photochromic film embedded in it. The unactivated transmission of the lens was measured as 70%. The activated transmission after exposure to a Xenon lamp under 20 W/m² intensity of UV was measured to be 19%. This demonstrated good photochromic activity.

EXAMPLE 2

To a solution of 18% by weight of a polyester urethane (Tecoflex CLC-93A from Thermedics) in THF solvent was added 2% each of Tinuvins 765,144, and Irganox 1010 (all from CIBA Corporation), and 0.8% of naphthopyran photochromic dye VP0762 (Proprietary Vision-Ease Dye). The mixture was then cast on a flat borosilicate glass plate and the solvent allowed to evaporate. A photochromic film of about 0.2 mm thick was obtained. The photochromic film was then placed between two glass molds held together with a standard casting gasket. A mixture of 58.3 grams of casting monomer P11 (NOF Corporation), 0.6 gram of Tinuvin 765, 0.26 gram of Trigonox 23 catalyst and 0.37 gram of Trigonox 21 catalyst was introduced between the glass molds and around the polyurethane film. The mold and gasket assembly was placed in a water bath and cured in a cycle that ramps the lens up to 90° C. over a 20 hour period. The resultant thermoset, cast lens is then separated from the glass molds. The lens had a refractive index of 1.55. The lens sample was then fatigued by exposure to a Xenon lamp with an ultraviolet light output of 30 Watts/Square Meter for 144 hours. This simulates actual wear of the lens by someone for a two year wear period. After the 144 hours, the photochromic performance remaining was 97%. This compares to the performance of the commercial photochromic polycarbonate Quantum (Transitions Optical, Inc.) lens product that is believed to be only a 65% remaining performance. Thus, the photochromic film in the cast lens was very fatigue resistant and had longer life than the prior art.

EXAMPLE 3

A photochromic film was prepared according to the examples in U.S. patent application Ser. No. 10/938,275. The polyurethane layer is 40 μm thick, and the protective layers are 350 μm thick polycarbonate films. The polyurethane layer and protective layers were bonded together to form a photochromic laminate. The laminate was masked with a 3M film (24S56W). A 70-mm disk was die-cut off from the above laminate, and formed into a 6-base laminate wafer through a thermo-vacuum forming process. The temperature was 255° F., and the forming time was 200 seconds. A 70-lens cast gasket and two 6-base glass molds (front and back) were used to cast the photochromic lens. The masked film is thereafter removed prior to placement of the laminate wafer into the gasket. The laminate wafer was placed against the front mold surface and placed into the gasket with the back mold. A clear UV-curable cast resin from OptiCast (OPIV-B) was injected into the back cavity. The cast resin in the above setup was cured under a 12-mW/m² UV exposure for 7 minutes. The result was a cast resin lens having the photochromic laminate fused to the front of it. The unactivated transmission of the lens was measured as 79%. The activated transmission after exposure to a Xenon lamp under 12 W/m² intensity of UV was measured to be 19%. This demonstrated good photochromic activity.

EXAMPLE 4

A photochromic film was prepared by laminating 13.5 mil thick CAB film (Kodacel K7896, made by Eastman Kodak) for both top and bottom protective layers and 38 micron photochromic layer (polyurethane). The laminate was masked with 3 M protective masking film (24S56 W) on both sides then a 86 mm disk in diameter was cut-out from the above laminate. It was formed into a 6 base laminate wafer through a thermo-vacuum forming process. The forming temperature was 235° F. and forming time was 150 seconds. It was further cut to 72.6 mm in diameter to fit the size of casting mold. It was further cut by 3 mm on two locations to allow flow of the cast resin around it. A 73 mm casting mold and two 6 base glass molds were used for front and back to cast a photochromic lens. The masked film is thereafter removed prior to placement of the laminate wafer into the gasket. Said formed photochromic film was placed in the mold about 1 mm away from the front mold surface with help of a spacer. Thermo-set resin RAV-7 (made by Great Lakes Chemical) without UV absorbing agent was injected to fill both front cavity and back cavity which were separated by the photochromic film. The cast resin in above setup was thermally cure in normal condition. The result was a cast resin lens having the photochromic laminate fused to the front of it. The unactivated transmission of the lens was measured as 82.4%. The activated transmission after exposure to a Xenon lamp under 12W/m2 intensity of UV was measured to be 16%. This demonstrated good photochromic activity.

EXAMPLE 5

A photochromic film was prepared by laminating 12 mil thick polycarbonate film (1151 by Teijin Kasei America) for both top and bottom protective layers and 38 micron photochromic layer (polyurethane). The polycarbonate film was applied with UV curable hardcoat as barrier coating on one side in advance. The hardcoated side was placed outside of lamination that later contacts casting resin. Without this barrier coating, this casting resin monomer has been shown to cause the polycarbonate film to turn white and, therefore, usable. The laminate was masked with 3M protective masking film (24S56W) on both sides then a 86 mm disk in diameter was cut-out from the above laminate. It was formed into a 6 base laminate wafer through a thermo-vacuum forming process. The forming temperature was 285° F. and forming time was 250 seconds. It was further cut to 72.6 mm in diameter to fit the size of casting mold. It was further cut by 3 mm on two locations to allow flow of the cast resin around it. A 73 mm casting mold and two 6 base glass molds were used for front and back to cast a photochromic lens. The masked film is thereafter removed prior to placement of the laminate wafer into the gasket. Said formed photochromic film was placed in the mold about 1 mm away from the front mold surface with help of a spacer. Thermo-set resin RAV-7 (made by Great Lakes Chemical) without UV absorbing agent was injected to fill both front cavity and back cavity which were separated by the photochromic film. The cast resin in above setup was thermally cure in normal condition. The result was a cast resin lens having the photochromic laminate fused to the front of it. The unactivated transmission of the lens was measured as 90.0%. The activated transmission after exposure to a Xenon lamp under 12 W/m 2 intensity of UV was measured to be 19%. This demonstrated good photochromic activity.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method of preparing a photochromic lens comprising:
    providing a photochromic film;
    placing said photochromic film within a cast mold in a manner sufficient to create a front cavity and back cavity of said cast mold;
    introducing a cast resin into said front cavity and said back cavity of said cast mold; and
    curing said cast resin to form a photochromic lens.

2. The method of claim 1, wherein providing a photochromic film comprises providing a photochromic laminate wafer having sufficient dimensions for placement into a cast gasket of said cast mold.

3. The method of claim 1, wherein providing a photochromic plate comprises providing a photochromic laminate wafer having sufficient curvature to match the front base curve of the photochromic lens.

4. The method of claim 1, wherein placing said photochromic film within a cast mold in a manner sufficient to create a front cavity and back cavity comprises providing a photochromic film at a predetermined location within said cast mold.

* * * * *